United States Patent [19]

Greene

[11] Patent Number: 5,030,837

[45] Date of Patent: Jul. 9, 1991

[54] THERMAL BEACON ASSEMBLY

[75] Inventor: Sidney R. Greene, Tucson, Ariz.

[73] Assignee: Hughes Aircraft Company, Los Angeles, Calif.

[21] Appl. No.: 406,981

[22] Filed: Sep. 13, 1989

[51] Int. Cl.$^5$ .......................... G21G 4/00; G01J 1/00
[52] U.S. Cl. .............................. 250/493.1; 250/504 R
[58] Field of Search ............. 250/493.1, 504 R, 505.1; 350/266, 319

[56] References Cited

U.S. PATENT DOCUMENTS

| | | | |
|---|---|---|---|
| 2,396,998 | 3/1946 | Garstang et al. | 250/505.1 |
| 3,100,828 | 8/1963 | Jacobs et al. | 250/493.1 |
| 3,219,827 | 11/1965 | Pittinger | 250/504 |
| 4,432,818 | 2/1984 | Givens | 149/22 |
| 4,499,382 | 2/1985 | Vincent | 250/504 R |
| 4,595,258 | 6/1986 | Le Compte | 350/266 |

Primary Examiner—Bruce C. Anderson
Attorney, Agent, or Firm—C. D. Brown; R. M. Heald; W. K. Denson-Low

[57] ABSTRACT

An improved beacon assembly 30 for use with a beacon 34 for providing radiant energy. The invention 30 includes a single plate 32 having an open interior to provide a frame through which the radiant energy from said beacon 34 may pass and apparatus 36 for mounting the plate 32 and the beacon 34 to the missile 10.

In a more specific embodiment, the plate 32 is constructed of aluminum and has arcuate inner 42 and outer 44 peripheries connected by substantially straight sections 46 and 48 to provide a pie shape with a pie shaped piece removed from the small end thereof to provide a frame through which the radiant energy from the beacon 34 may pass.

The improved beacon assembly of the present invention 30 affords a low cost lightweight retrofit of existing missiles with a thermal beacon 34.

6 Claims, 4 Drawing Sheets

FIG. 4
PRIOR ART
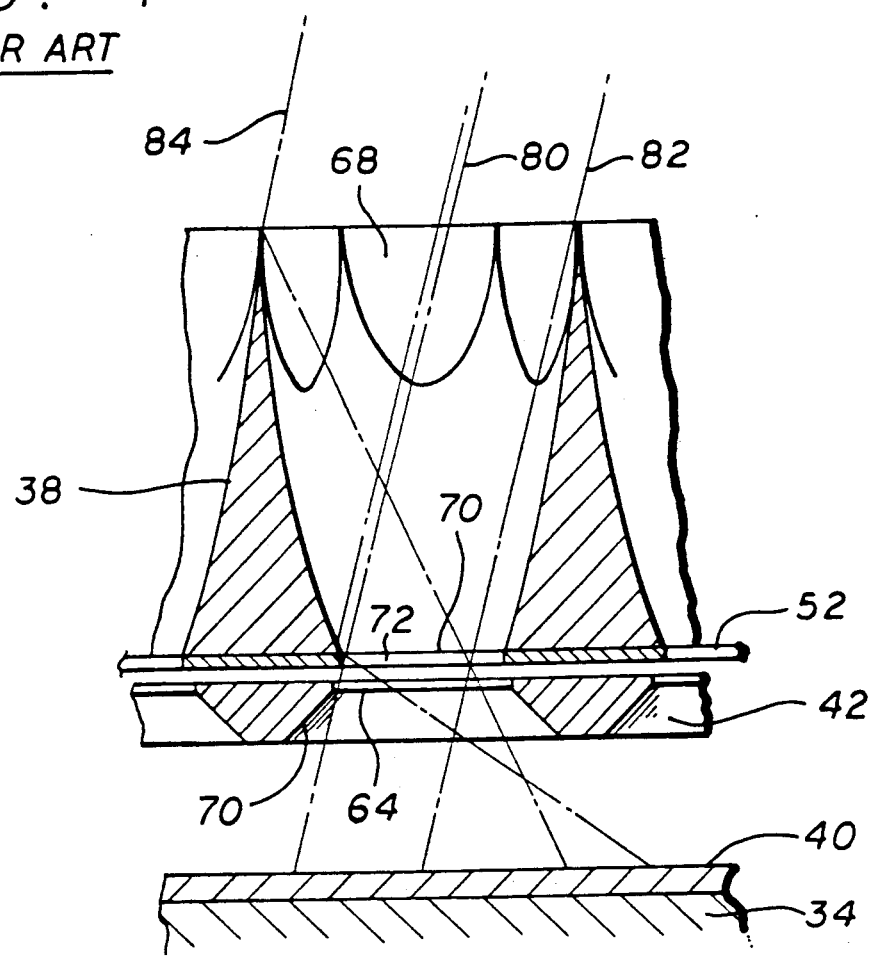
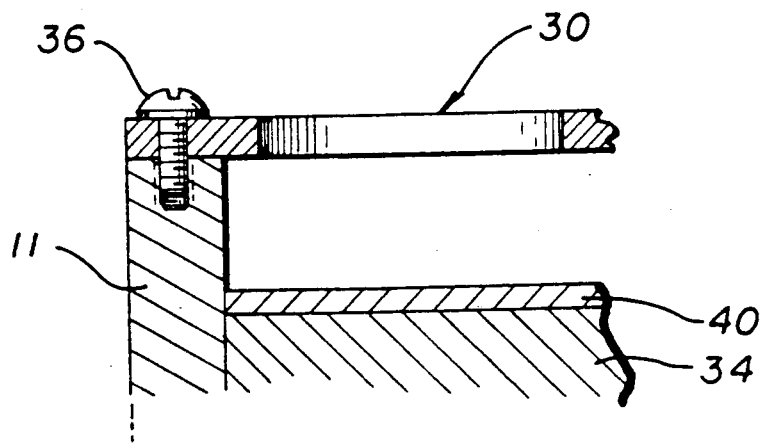
FIG. 6

THERMAL BEACON ASSEMBLY

BACKGROUND OF THE INVENTION

1. Field of the Invention

The present invention relates to beacon assemblies. More specifically, the present invention relates to beacon assemblies used to provide optical and thermal guidance for aerodynamic vehicles.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Tube launched optically tracked wire guided missile systems generally include a launcher and a wire guided missile. The launcher is equipped with a gunners optical sight and an electronic guidance computer which automatically sends steering commands to the missile in flight over the wire or optical command link. A light source in the tail of the missile is activated after launch or immediately prior thereto. The light source is detected by a sensor in the launcher. The sensor is boresighted with the gunner's telescope and allows the launcher to track the missile along its flight path. The sensor and associated processing circuitry measures the angle between the missile and the gunner's line-of-sight. These displacements are transformed by the computer into guidance commands which are sent to the missile. The gunner need only keep the crosshairs of the telescope on the target during missile flight.

Unfortunately, in a hostile environment, the ability of the launcher to track the light source (and hence the missile) may be impaired by natural and artificial impediments and countermeasures including fog haze and smoke. When augmented by a forward looking infrared (FLIR) sensor and display, the operator has the capability of seeing and hitting many targets which would otherwise be obscured. For this purpose, the system is augmented with a thermal beacon which is activated prior to launch. If the system is unable to track the visible (typically xenon) light source, handoff to the thermal source occurs.

To guard against certain countermeasures intended to confuse the launcher, a system was developed to blink the thermal beacon on command from the launcher and thereby distinguish from a countermeasure source. U.S. Pat. No. 4,595,258, issued June 17, 1986 to G. W. LeCompte discloses one such arrangement. This patent, entitled Shutter for Radiation Source of Extended Area, provides a shutter for producing a pulsed output from a thermal beacon or other radiant source. The shutter includes an optical plate and a shutter plate mounted on the radiant face of the thermal source. The referenced patent discloses a particularly advantageous design by which the plates are perforated so that when the plates are rotated relative to each other, the holes are aligned in one position to allow thermal energy or light from the beacon to pass. In a second position, the holes in the two plates are out of alignment and the radiant energy therefrom is blocked.

While the LeCompte design has been found to be particularly well suited for tube launched optically tracked wire guided missiles designed to accommodate a shuttered beacon, a need remains in the art for an arrangement which would permit missiles in the field to be retrofit with a thermal beacon.

SUMMARY OF THE INVENTION

The need in the art is addressed by the present invention which provides an improved beacon assembly for use with a light source for providing radiant energy. The invention includes a single plate having an open interior to provide a frame through which the radiant energy from said beacon may pass and apparatus for mounting the plate to the beacon.

In a more specific embodiment, the plate is constructed of aluminum and has arcuate inner and outer peripheries connected by substantially straight sections to provide a pie shape with a pie shaped piece removed from the small end thereof to provide a frame through which the radiant energy from the beacon may pass.

The improved beacon assembly of the present invention affords a low cost lightweight retrofit of existing missiles with a thermal beacon.

BRIEF DESCRIPTION OF THE DRAWINGS

FIG. 4 is a sectional side view of the beacon assembly constructed in accordance with the teachings of the LeCompte patent.

FIG. 6 is a sectional side view of the improved missile assembly of the present invention.

DESCRIPTION OF THE INVENTION

Illustrative embodiments and exemplary applications will now be described with reference to the accompanying drawings to disclose the advantageous teachings of the present invention.

Figure 1:
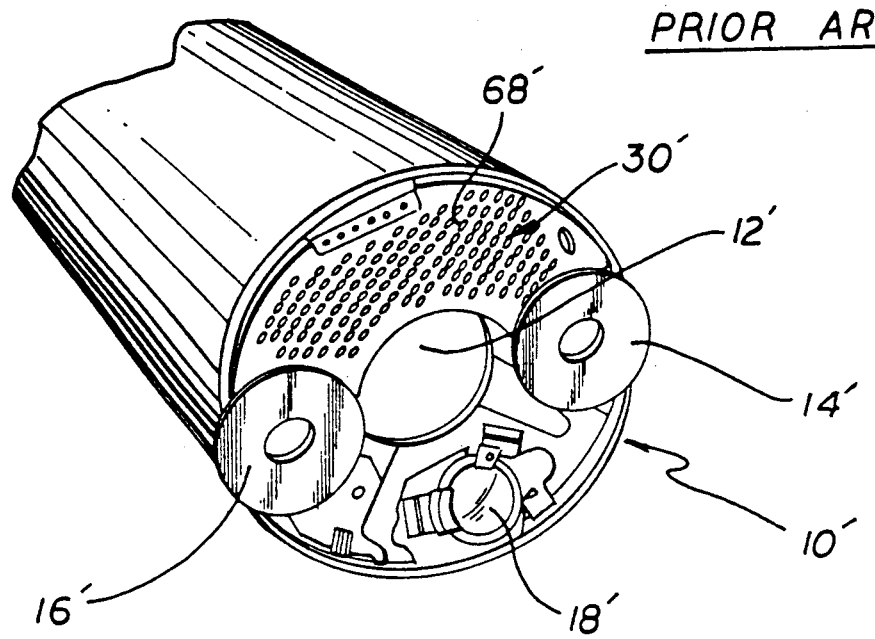
FIG. 1 is perspective view of a missile equipped with a beacon assembly designed in accordance with the teachings of the above-noted LeCompte patent.

FIG. 1 is perspective view of a missile 10' equipped with a beacon assembly 30' designed in accordance with the teachings of the above-noted LeCompte patent. The beacon assembly 30' is shaped to mount on the end of the missile on one side of a launch motor aperture 12' and first and second wire bobbins 14' and 16'. Note that the missile 10' is also equipped with a Xenon light source 18'.

Figure 2:
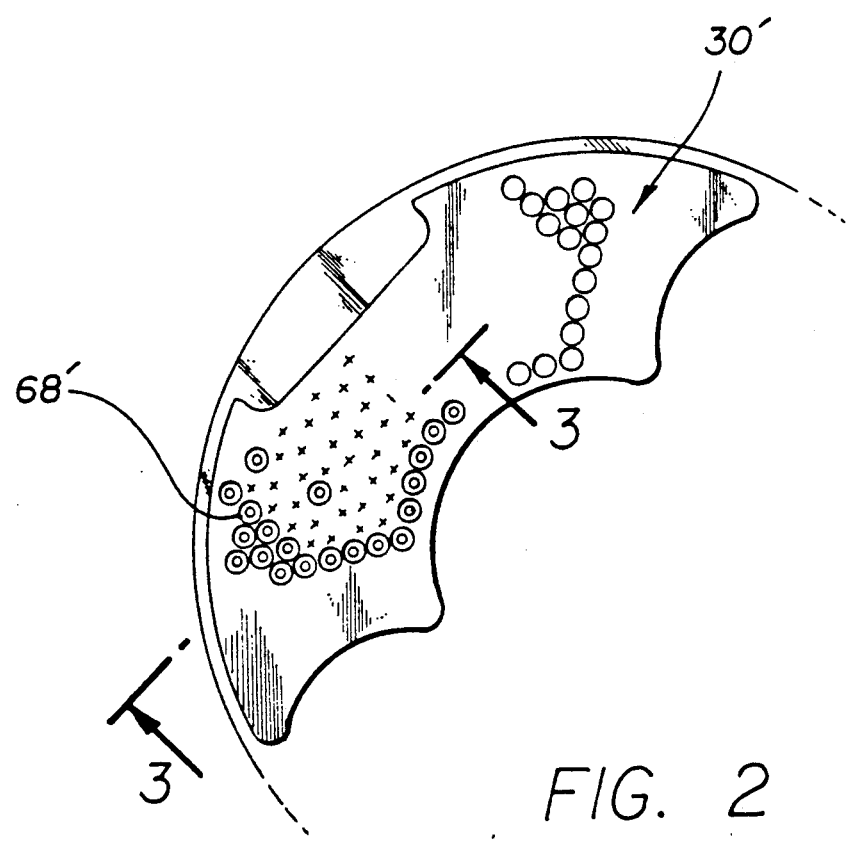
FIG. 2 is an end view of the beacon assembly of FIG. 1 designed in accordance with the teachings of the above-noted LeCompte patent.

FIG. 2 is an end view of the beacon assembly 30'. Note that the beacon assembly 30' has a plurality of cells 68' each having a parabolic surface and an optical opening extending therethrough. As shown in the fragmentary perspective sectional view of FIG. 3, and as described in the above-noted LeCompte patent, the beacon assembly 30' includes a thermal beacon (such as that described in U.S. Pat. No. 4,432,818) or other pyrotechnic device 34'. The thermal beacon 34' preferably contains its own fuel and oxidizer and is exothermic when ignited. The thermal beacon 34' is contained in a forward housing 36' which extends rearwardly to embrace an outer plate 38' which serves as 5 a main structural member of the beacon 30'.

Figure 3:
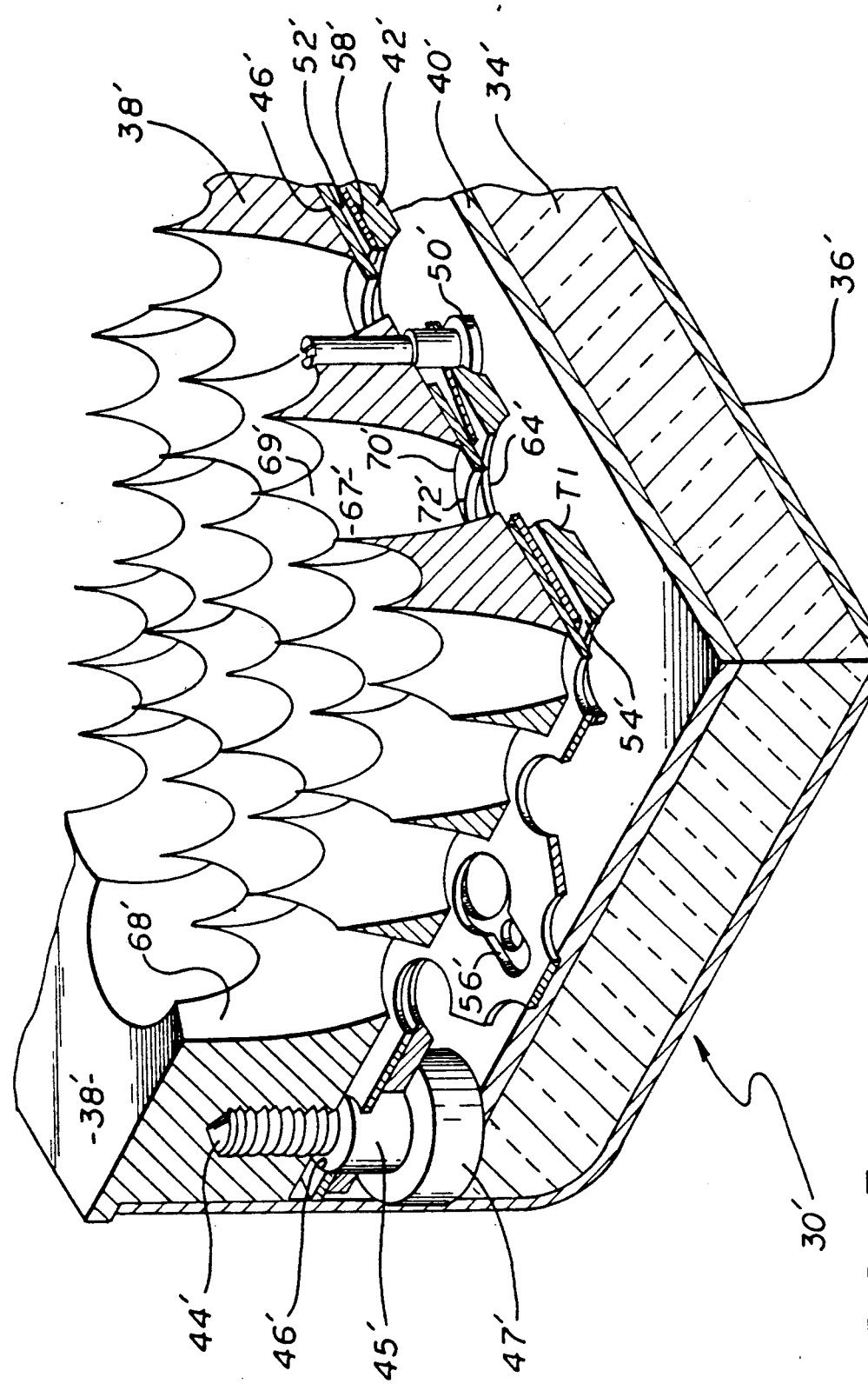
FIG. 3 is a fragmentary perspective sectional view of the beacon assembly of FIG. 1 designed in accordance with the teachings of the above-noted LeCompte patent.

The housing 36' is closed by a radiant source coating 40' which is heated by the thermal beacon 34' and radiates rearward, in the upward direction in FIG. 3, toward an outer plate 38'. An inner optical plate 42' is mounted to the forward side of the outer optical plate 38' by a plurality of screws one of which is shown at 44' in FIG. 3. A shoulder 45' on the screw 44' engages the forward face 46' of the outer optical plate 38' which is the main structural member of the beacon assembly 30'. A head 47' on the screw 44' is thus spaced from the forward face 46' of the outer optical plate 38'. The shouldered shank of the screw 44' engages through an opening in the inner optical plate 42' and the head 47' serves to constrain the inner optical plate 42' and prevent it from moving farther away from the outer optical plate 38'. There are several screws 44' adjacent to the edges of the outer optical plate 38'. In order to constrain the center portion of the inner optical plate 42', rivets such as rivet 50' are appropriately spaced across the area of the inner optical plate 42'.

A shutter 52' is provided by a thin plate positioned against the forward surface 46' of the outer optical plate 38'. The shutter 52' has a slot adjacent all screws and rivets passing through the space 54' between the inner and outer optical plates 42' and 38' respectively. Such a slot is indicated at 56' with respect to rivet 50' in FIG. 3. At least three such screws or rivets are necessary to maintain the spacing and orientation of the optical plates. A slot is provided in the shutter 52' for all such screws and rivets. The slots in the shutter 52' around the screws and rivets are aligned in the same direction to permit sliding motion of the shutter plate preferably a distance slightly greater than the diameter of the radiating openings described below. The shutter 52' is shown in an intermediate position in FIG. 3 between its leftmost or closed and open positions.

The outer optical plate 38', the inner optical plate 42' and the shutter 52' serve to control the radiation emitted from the heated coating 40'. The openings in the outer optical plate 38' are aligned with openings 71' in the inner optical plate 42'. The inner optical plate 42' provides mechanical constraint and heat shielding for the shutter 52'. A wave spring 58' with its matching perforations holds the shutter plate in intimate contact with the forward face 46' of the outer optical plate 38' to cause a sharp cut-off. When the shutter is in the open position, each of the elements at the rear of the beacon mechanism has an opening which is aligned with the openings in the other elements. (The shutter 52' can be operated by any desired actuator, e.g., electromagnetic, pneumatic, or hydraulic.) Thus, a plurality of openings is provided by the cells 68', each being similar and spaced from the other. The reflective cells 68' are of the same construction. Each cell 68' is formed with mirrored walls to maximize radiation. In order to maximized the reflective surface seen from the rear, the cell openings 67' in the outer optical plate 38' are divergent in the direction of the radiant output and adjoin each other as hexagonal cells. One of the cell edges is shown at 69'. This allows the perforated shutter plate 52' between the array of cells in the outer optical plate 38' and the emitting source 40' to pass or block radiation by moving the shutter plate 52' by a distance equal to the diameter of the openings 70' in the shutter plate 52'.

FIG. 4 is a sectional side view of the beacon assembly 30' constructed in accordance with the teachings of the LeCompte patent.

Figure 5:
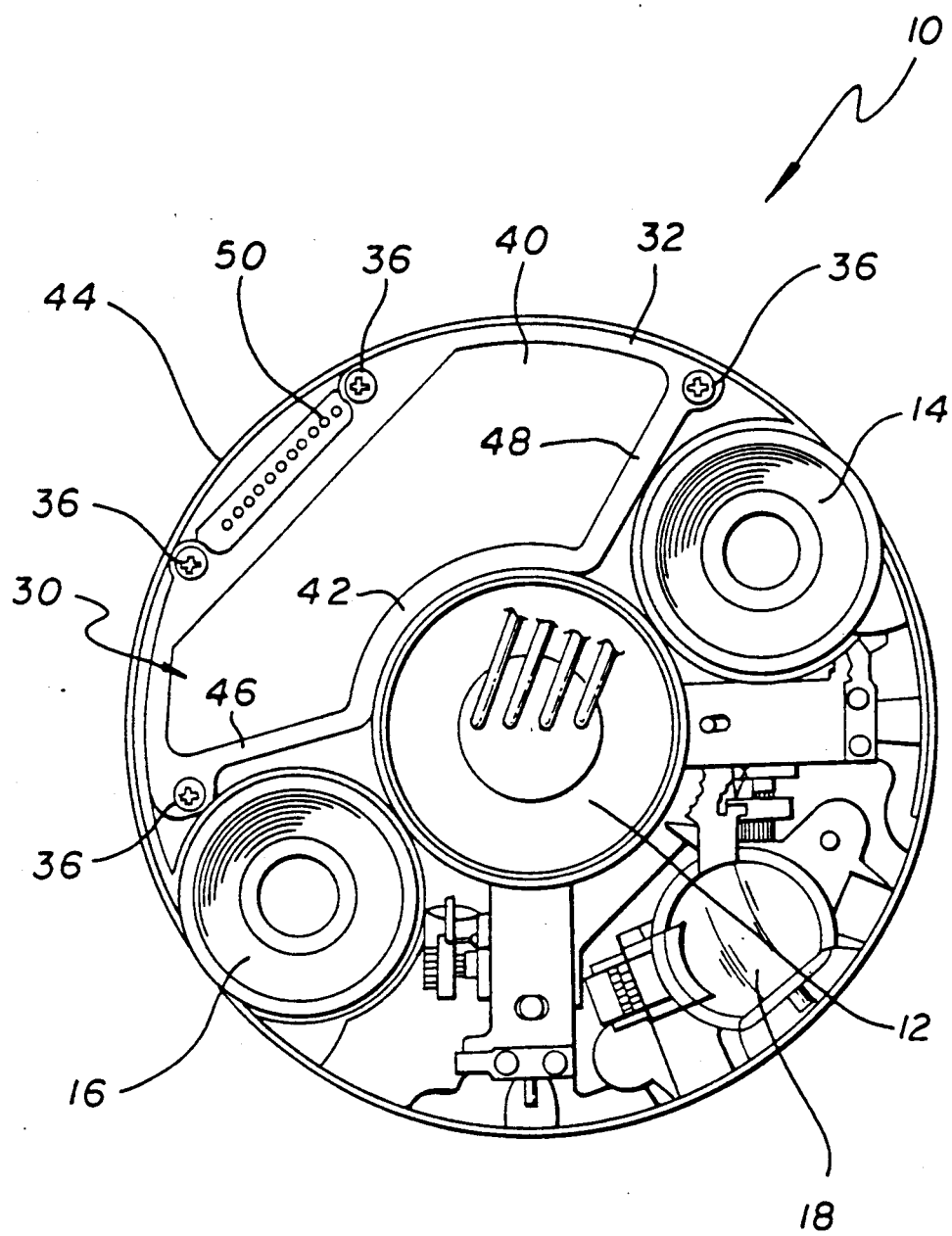
FIG. 5 is a rear view of a missile with the improved beacon assembly of the present invention mounted thereon.

Although the electrical circuitry required to operate the shutter 52' of the beacon assembly 30' is omitted, it is evident from FIGS. 1-4, that the assembly is somewhat complex and may be too heavy and costly for certain applications. The requirement of associated electronics to operate the shutter 52' is particularly problematic for the retrofit of existing missiles. Accordingly, the improved beacon assembly 30 of the present invention is hereby disclosed. The beacon assembly 30 of the present invention is shown in FIG. 5. FIG. 5 is a rear view of a missile 10 with the improved beacon assembly of the present invention 30 mounted thereon.

As shown in the sectional side view of FIG. 6, the improved beacon assembly 30 of the present invention is adapted for use with a conventional thermal beacon 34 (such as that described in U.S. Pat. No. 4,432,818) or other pyrotechnic device. Returning to FIG. 5, the assembly 30 includes a single plate 32 having an open interior to provide a frame through which the radiant energy from the beacon 34 may pass. A plurality of mounting screws 36 engage tap holes in mounting blocks 11 attached to the missile housing through mounting blocks 11 to secure the plate 32 which is attached to the beacon 34. The plate 32 is constructed of aluminum or other suitable material capable of withstanding the extreme heat of the thermal beacon 34. The plate 32 has arcuate inner and outer peripheries 42 and 44 connected by substantially straight sections 46 and 48 to provide a pie shape with a pie shaped piece removed from the small end thereof. Hence, the plate 32 provides a frame through which the radiant energy from the beacon 34 may pass. Note that the entire thermal coating 40 of the beacon 34 is unobstructed and visible through the opening in the plate 32. The plate 32 is shaped to accommodate a launch motor aperture 12 and first and second wire bobbins 14 and 16. Note that the missile 10 is again equipped with a Xenon light source 18. The plate 32 also includes a cutout to accommodate a conventional command control connector 50.

Thus, an improved beacon assembly has been described which affords a low cost lightweight retrofit of existing missiles with a thermal beacon. While the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

WHAT IS CLAIMED IS:

1. An improved guided missile beacon assembly for use with a light source for providing radiant energy comprising:
   a single plate having an open interior to provide a frame through which the radiant energy from said beacon assembly may pass; and
   means for mounting said plate to said guided missile beacon assembly.

2. The invention of claim 1 wherein said plate is constructed of metal.

3. The invention of claim 2 wherein said plate is constructed of aluminum.

4. The invention of claim 1 wherein said plate has arcuate inner and outer peripheries connected by substantially straight sections to provide a pie shape with a pie shaped piece removed from the small end thereof.

5. An improved guided missile beacon assembly for use with a beacon for providing radiant energy comprising:
- a single aluminum plate having an open interior and arcuate inner and outer peripheries connected by substantially straight sections to provide a pie shape with a pie shaped piece removed from the small end thereof to provide a frame through which the radiant energy from said beacon may pass and
- means for mounting said plate to said beacon.

6. A missile apparatus comprising:
- a beacon for providing radiant energy;
- a single aluminum plate having an open interior and arcuate inner and outer peripheries connected by substantially straight sections to provide a pie shape with a pie shaped piece removed from the small end thereof to provide a frame through which the radiant energy from said beacon may pass; and
- means for mounting said plate to said beacon.

* * * * *